United States Patent
Wada et al.

(10) Patent No.: US 6,256,783 B1
(45) Date of Patent: Jul. 3, 2001

(54) OBJECT CONVERSION APPARATUS, OBJECT CONVERSION METHOD AND PROGRAM STORING MEDIUM

(75) Inventors: Mikayo Wada; Shigenori Koyata; Mitsuo Sakurai, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/132,139

(22) Filed: Aug. 10, 1998

(30) Foreign Application Priority Data

Dec. 26, 1997 (JP) .................................................... 9-360909

(51) Int. Cl.[7] .................................................... G06F 9/45
(52) U.S. Cl. .................................................... 717/9; 717/5
(58) Field of Search ........................... 395/705, 500.43, 395/709, 707, 712, 708; 717/5, 7, 8, 9, 11; 703/22

(56) References Cited

U.S. PATENT DOCUMENTS

| | | | |
|---|---|---|---|
| 5,212,794 | * | 5/1993 | Pettis et al. ................................. 717/9 |
| 5,432,937 | * | 7/1995 | Tevanian et al. ........................ 717/11 |
| 5,560,013 | * | 9/1996 | Scalzi et al. .............................. 717/5 |
| 5,590,331 | * | 12/1996 | Lewis et al. .............................. 717/8 |
| 5,598,560 | * | 1/1997 | Benson ..................................... 717/7 |
| 5,655,122 | * | 8/1997 | Wu ............................................ 717/5 |
| 5,819,067 | * | 10/1998 | Lynch ..................................... 703/22 |
| 5,835,773 | * | 11/1998 | Dunn ........................................ 717/5 |

FOREIGN PATENT DOCUMENTS

| | | | |
|---|---|---|---|
| 4-213730 | 8/1992 | (JP) | .................................. G06F/9/44 |
| 6-282437 | 10/1994 | (JP) | .................................. G06F/9/44 |

OTHER PUBLICATIONS

Cohn–Lowney, Hot Cold Optimization of Large Windows/NT Applications, IEEE, Dec. 1996.*
Raymond J. Hookway, et al., Digital FX132: Combining Emultion and Binary Translation (11 pages total).
Kemal Ebcioglu, et al., IBM Research Report, Daisy: Dynamic Compilation For 100% Architectural Compatibility, RC 20539 (Aug. 5, 1996) Computer Science, pp. 1–82.
Kemal Ebcioglu, et al., Daisy: Dynamic Compilation For 100% Architectural Compatibility, IBM Thomas J. Watson, Research Center, Yorktown Heights, NY 10598, pp. 26–37.

* cited by examiner

Primary Examiner—Kakali Chaki
Assistant Examiner—Hoang-Vu Antony Nguyen-Ba
(74) Attorney, Agent, or Firm—Staas & Halsey LLP

(57) ABSTRACT

The present invention introduces an object conversion apparatus with both advantages of the dynamic object conversion and advantages of the static object conversion. In the object conversion apparatus, an application program to be converted is divided into some blocks, and a page table is provided in order to specify whether each block is processed by the dynamic object conversion or the static object conversion. Based on the information specified in the page table, an instruction in the block used with high frequency is processed with the dynamic object conversion, and an instruction in the block used with low frequency is processed with the static object conversion.

10 Claims, 15 Drawing Sheets

FIG. 2

| IDENTIFICATION CODE | CONVERSION RULE INFORMATION | EXCEPTION PROCESS CHECK INFORMATION | OBJECT CODE LENGTH | ANALYSIS PROCESS ENTRY | OPERAND PATTERN PROCESS ENTRY | POINTER TO SKELETON TABLE |
|---|---|---|---|---|---|---|
| | | | | | | |
| | | | | | | |
| | | | | | | |
| | | | | | | |

⎵ FIXED LENGTH PART (1) ⎵⎵ FIXED LENGTH PART (2) ⎵

FIG. 3

| IDENTIFICATION CODE | SORT KEY INFORMATION | CHAIN POINTER | NUMBER N OF EXCHANGE INFORMATION | NATIVE CODE LENGTH | EXCHANGE INFORMATION (N PIECES) | NATIVE CODE INFORMATION |
|---|---|---|---|---|---|---|
| | | | | | | |
| | | | | | | |
| | | | | | | |
| | | | | | | |

FIXED LENGTH PART: IDENTIFICATION CODE, SORT KEY INFORMATION, CHAIN POINTER, NUMBER N OF EXCHANGE INFORMATION, NATIVE CODE LENGTH

VARIABLE LENGTH PART: EXCHANGE INFORMATION (N PIECES), NATIVE CODE INFORMATION

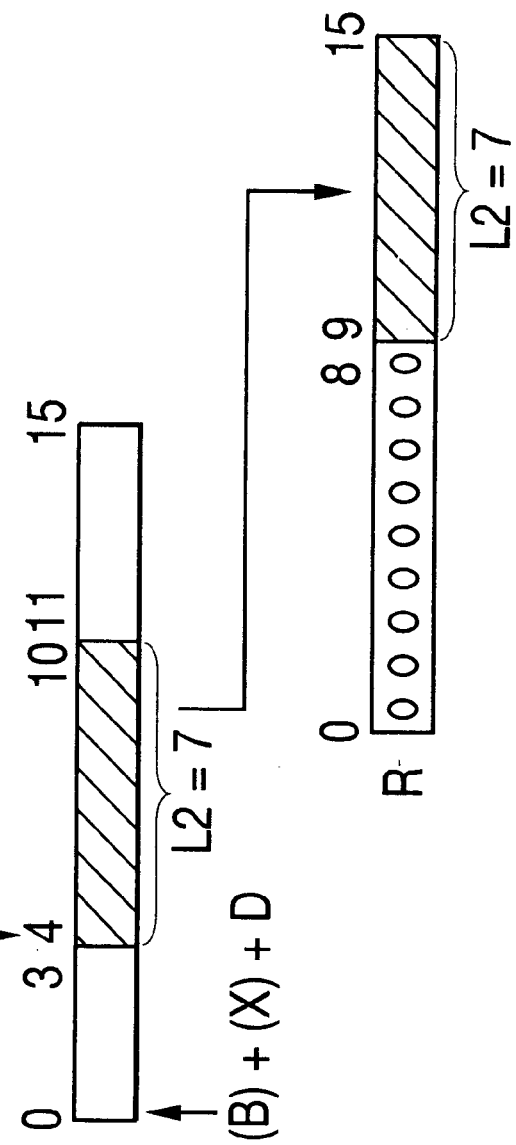
FIG. 4(a)
FIG. 4(b)

FIG. 5(a)

BXD PROTOTYPE
CHECK PROTOTYPE EXPECT ADDRESS

MOV  AH.  BYTE PTR [EDX]
MOV  AL.  BYTE PTR [EDX + 1]
SHL  AX.  L1
SHR  AX.  16 - L2
MOV  WORD PTR [EDI + Rxx]. AX
PSW-IA POINT UP PROTOTYPE

FIG. 5(b)

CASE IN THAT L1=0, L2=0

FIG. 5(c)

CASE IN THAT L1=0, 1≤L2≤8
MOV  AH.  BYTE PTR [EDX]
MOV  AL.  BYTE PTR [EDX + 1]
SHR  AX.  16 - L2
MOV  WORD PTR [EDI + Rxx]. AX

FIG. 5(d)

CASE IN THAT L1=0, L2=8
MOVZX AL. BYTE PTR [EDX]
MOV  WORD PTR [EDI + Rxx]. AX

FIG. 5(e)

CASE IN THAT L1=0, 8≤L2≤15
MOV  AH.  BYTE PTR [EDX]
MOV  AL.  BYTE PTR [EDX + 1]
SHR  AX.  16 - L2
MOV  WORD PTR [EDI + Rxx]. AX

FIG. 5(f)

CASE IN 1≤L1≤7, L1+L2≤7
MOV  AH.  BYTE PTR [EDX]
SHL  AX.  L1
SHR  AX.  16 - L2
MOV  WORD PTR [EDI + Rxx]. AX

FIG. 5(g)

CASE IN 1≤L1≤7, L1+L2=8
MOV  AH.  BYTE PTR [EDX]
SHL  AX.  L1
AND  AX.  zz00H
MOV  WORD PTR [EDI + Rxx]. AX
zz SET IN ACCORDANCE WITH
VALUE SPECIFIED FOR L1

FIG. 5(h)

CASE IN 1≤L1≤7, L1+L2=16
MOV  AH.  BYTE PTR [EDX]
MOV  AL.  BYTE PTR [EDX + 1]
AND  AX.  zzzzH
MOV  WORD PTR [EDI + Rxx]. AX
zzzz SET IN ACCORDANCE WITH
VALUE SPECIFIED FOR L1

FIG. 5(i)

CASE IN THAT 8≤L1≤16, L1+L2=16
MOV  AL.  BYTE PTR [EDX + 1]
AND  AX.  00zzH
MOV  WORD PTR [EDI + Rxx]. AX
zz SET IN ACCORDANCE WITH
VALUE SPECIFIED FOR L1

FIG. 6

| ASP INSTRUCTION OBJECT | CONVERTED OBJECT | OPTIMIZED OBJECT |
|---|---|---|
| (1) AREA A → GENERAL-PURPOSE REGISTER 0 | AREA A → INTERNAL REGISTER a<br>INTERNAL REGISTER a → GR0 | AREA A → INTERNAL REGISTER a |
| (2) AREA B → GENERAL-PURPOSE REGISTER 1 | AREA B → INTERNAL REGISTER b<br>INTERNAL REGISTER b → GR1 | AREA B → INTERNAL REGISTER b |
| (3) GENERAL-PURPOSE REGISTER 0 + GENERAL-PURPOSE REGISTER 1<br>→ GENERAL-PURPOSE REGISTER 0 | GR0 → INTERNAL REGISTER a<br>GR1 → INTERNAL REGISTER b<br>INTERNAL REGISTER a + INTERNAL REGISTER b<br>→ INTERNAL REGISTER a<br>INTERNAL REGISTER a → GR0 | INTERNAL REGISTER a + INTERNAL REGISTER b<br>→ INTERNAL REGISTER a |
| (4) GENERAL-PURPOSE REGISTER 0 × 4<br>→ GENERAL-PURPOSE REGISTER 0 | GR0 → INTERNAL REGISTER a<br>4 → INTERNAL REGISTER b<br>INTERNAL REGISTER a × INTERNAL REGISTER b<br>→ INTERNAL REGISTER a<br>INTERNAL REGISTER a → GR0 | INTERNAL REGISTER a LEFT SHIFT 2 BIT<br>→ INTERNAL REGISTER a<br><br>INTERNAL REGISTER a → GR0<br>INTERNAL REGISTER b → GR1 |

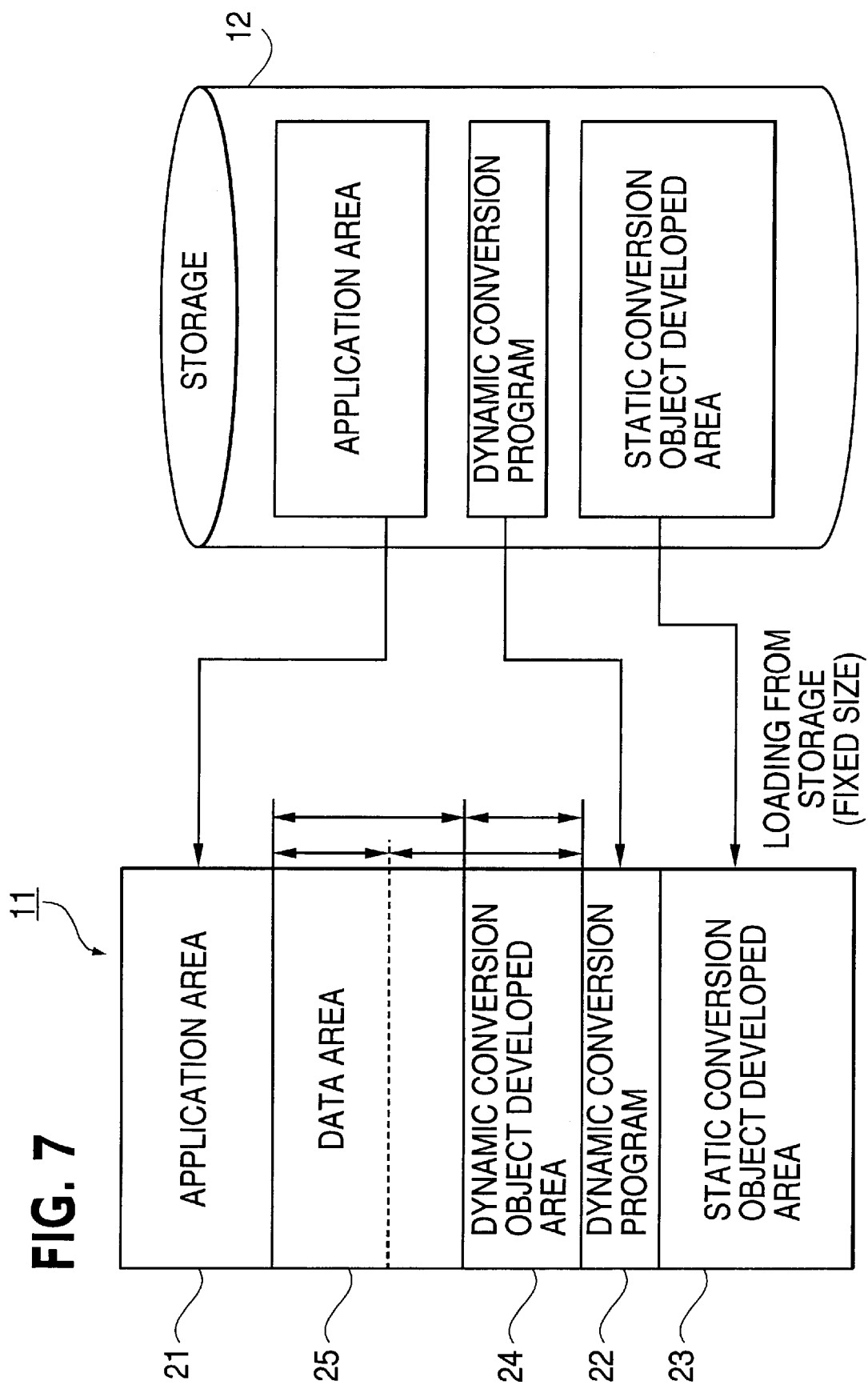

FIG. 8
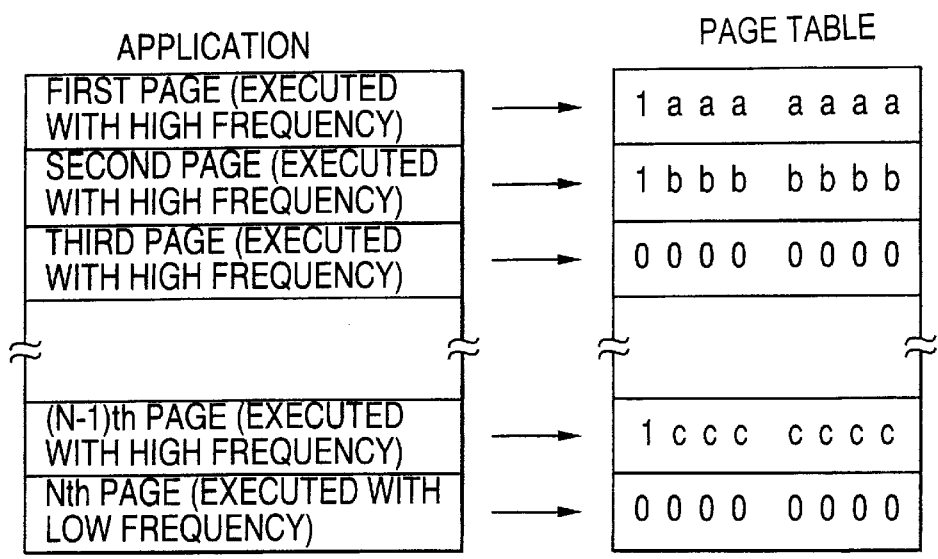
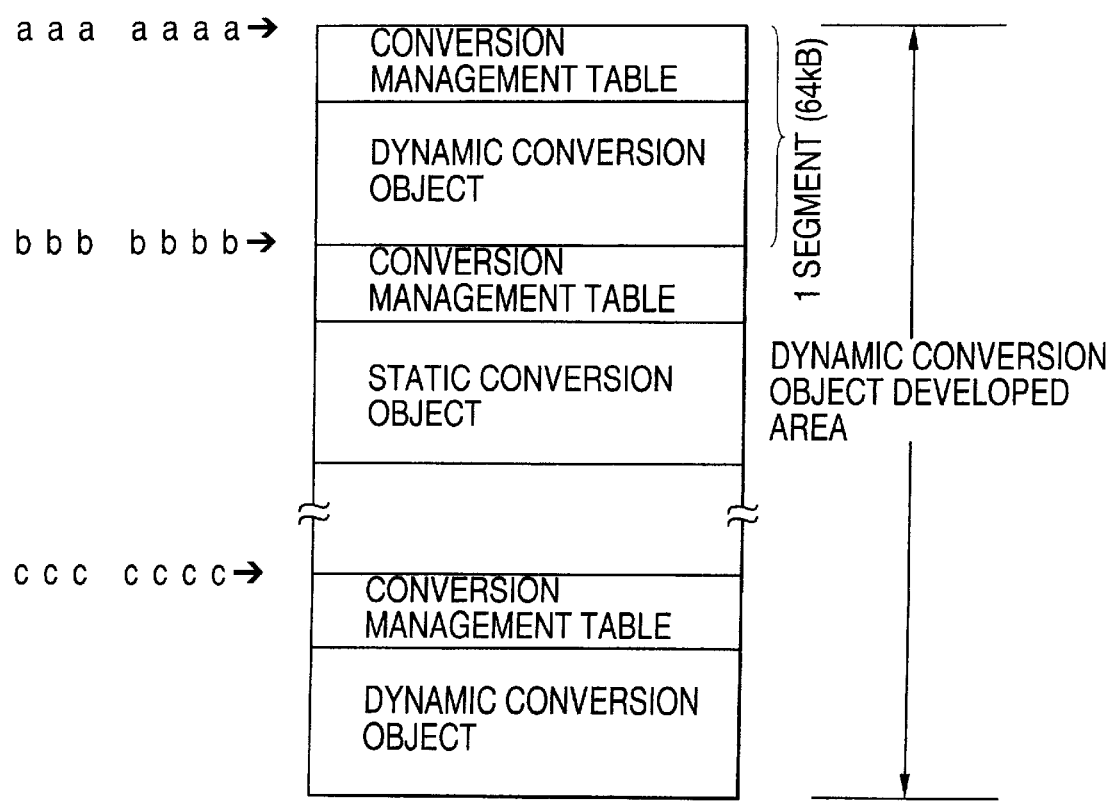

FIG. 10

```
label 0:
    MCD
    TST  flag0,0,label0'
    JMP  label1
label0':
    JMP  label2
```

AREA 0: NOT TO BE CONVERTED
1) SWITCHING DYNAMIC OBJECT
   CONVERSION AREA
2) IF flag0=0, TO label0'
3) JUMP TO label1

4) JUMP TO label2

```
label1:
    ADD  data0,data1
    CVD  data0
    TST  data0,0,label1'
    JMP  label3
label1':
    JMP  label4
```

AREA 1: TO BE CONVERTED
5) data0 ← data0 + data1
6) CONVERTING BINARY DATA (data0)
   INTO DECIMAL DATA
7) IF data0=0, TO label1'
8) JUMP TO label3
9) JUMP TO label4

```
label2:
    ⌇
    TST  flag2,0,label2'
    JMP  label1
label2':
    JMP  label4
```

AREA 2: NOT TO BE CONVERTED
10) IF FLAG2=0, TO LABEL2'
11) JUMP TO label1

12) JUMP TO label4
AREA 3: NOT TO BE CONVERTED

```
label3:
    ⌇
```

```
label4:
    ⌇
```

AREA 4: TO BE CONVERTED

OBJECT CONVERSION APPARATUS, OBJECT CONVERSION METHOD AND PROGRAM STORING MEDIUM

BACKGROUND OF THE INVENTION

1. Field of the Invention

The present invention relates to an object conversion apparatus, an object conversion method, and a program storing medium, more particularly, relates to an object conversion apparatus, in which an object (program object) for one architecture is converted into an object for another architecture suitable to the object conversion apparatus so as to be executed and an object conversion method, and to a program storing medium storing a program making computer operate as the object conversion apparatus.

2. Description of the Related Art

As known, it is necessary to convert an object, in order to use the object developed for one computer in another computer of which the architecture is different from that of the computer. As conversion methods for such an object, there is a method called a "static object conversion method", in which an instruction statements are previously converted into an object acting similarly in another architecture. There is also a method called a "dynamic object conversion method", in which an object is converted while executing instructions.

In the static object conversion method, an execution time is not influenced by the time for conversion. However, in general, a size of the converted object becomes large when the static object conversion is executed. In other words, in the static object conversion, a number of operating steps in the converted object increases, and as a result, there is a problem that performance of the object deteriorates. On the other hand, in the dynamic object conversion method, a size of the object obtained by the conversion becomes comparatively small. However, there is a problem in that, when the object to be converted includes an object not to be executed multiple times, the time for conversion of the object reduces the total operating speed of the converted object.

Accordingly, it is a purpose of the present invention to provide an object conversion apparatus and an object conversion method producing no above-described problems.

Further, it is a another purpose of the present invention to provide a program storing medium stored with a program making a computer operate as such an object conversion apparatus.

SUMMARY OF THE INVENTION

To solve the above described problems, according to the present invention, an object conversion apparatus converting a first object operating in a first architecture into a second object operating in a second architecture in same the manner as the first object, the object conversion apparatus comprising (1) a first storage unit for storing use frequency information showing whether the first object is used with high frequency or not, (2) a determining unit for determining whether the first object is used with high frequency or not based on the use frequency information stored in the first storage unit, and (3) a second storage unit for storing the second object corresponding to the first object determined by the determining unit as used with high frequency.

An object conversion apparatus according to the present invention may further comprise an object conversion execution unit, in a case that the determining unit determines that the first object is used with high frequency, for executing the second object when the second object corresponding to the first object is stored in the second storage unit, and for converting the first object into the second object corresponding to the first object when the second object corresponding to the first object is not stored in the second storage unit.

The object conversion execution unit, for a specified first object among first objects determined by the determining unit as used with high frequency, executes a prepared second object corresponding to the specified first object.

The use frequency information may show whether the first object may be used with high frequency or not per page containing the first objects, the second storage unit may be provided with a predetermined number and predetermined sizes of memory areas, the object conversion apparatus may further comprise a management unit for managing a relation between the page and the memory area in the second storage area, and the object conversion execution unit may store the second object obtained by converting the first object in the memory area of the second memory means, the memory area corresponded to the page containing the object with said management unit.

Further, a change unit may be provided for changing the predetermined number of the memory areas in the second storage unit.

The management unit may manage a used order of the second objects in each of the memory areas, and, when all of the memory areas are used to store second objects and when it is necessary to store in said second storage unit with a second object corresponding to a first object in a new page, purges a second object in a most formerly used memory area and uses the memory area for the new page.

The management unit may manage a number of processes using a second object in each of the memory areas, and, when all of the memory areas are used to store second objects and when it is necessary to store in said second storage means with a second object corresponding to a first object in a new page, purges a converted object in a most formerly used memory area among memory areas in which the number of processes is not more than a predetermined value.

The object conversion execution unit may generate second objects corresponding to plural first objects determined by said determining means as used with high frequency. With this function, flexibility increases for converting an object for an architecture into another object for another architecture, therefore, it is possible to convert an object into a better object.

Additionally, the object conversion apparatus according to the present invention may be an apparatus using a processor. A processor designed for only these functions may be used, and a predetermined program may be supplied to a processor in a general computer through program storage media.

BRIEF DESCRIPTION OF THE DRAWINGS

Other objects and advantages of the present invention will become apparent during the following discussion in conjunction with the accompanying drawings, in which:

FIG. 2 is an explanatory view showing an operation table in the object conversion apparatus of the embodiment;

FIG. 3 is an explanatory view showing a CISC prototype part in a skeleton table in the object conversion apparatus of he embodiment;

FIGS. 4(a) and 4(b) are explanatory views showing a load bit (LB) instruction used in the Advanced System Products (ASP) operating system of Fujitsu Limited;

FIGS. 5(a) through 5(i) are explanatory views showing a dynamic object conversion process executed by the object conversion apparatus of the embodiment in accordance with the LB instruction;

FIG. 6 is an explanatory view showing a dynamic object conversion process executed by the object conversion apparatus of the embodiment;

FIG. 7 is an explanatory view showing how to use a memory in the object conversion apparatus of the embodiments;

FIG. 8 is an explanatory view showing a page table and a dynamic conversion object developed area set in the objects inversion apparatus of the embodiment;

FIG. 10 is a program list showing the whole operation procedure in the object conversion apparatus of the embodiment;

DETAILED DESCRIPTION OF THE PREFERRED EMBODIMENT

Hereinafter, concrete explanations will be given of the present invention with reference to drawings.

An object conversion apparatus of an embodiment according to the present invention uses the static object conversion and the dynamic object conversion when converting and executing an object.

First, an explanation will be given of the operation procedure of the object conversion apparatus according to the embodiment in the dynamic object conversion, before explaining all operations of this apparatus. The object conversion apparatus of the embodiment is carried out by installing a dynamic conversion program (one of operating systems) in a computer, therefore, no explanation will be given of a hardware configuration.

The object conversion apparatus uses tables called "an operation code table", "an operation table", and "a skeleton table", in order to obtain an object for one architecture from an object for another architecture.

Figure 1:
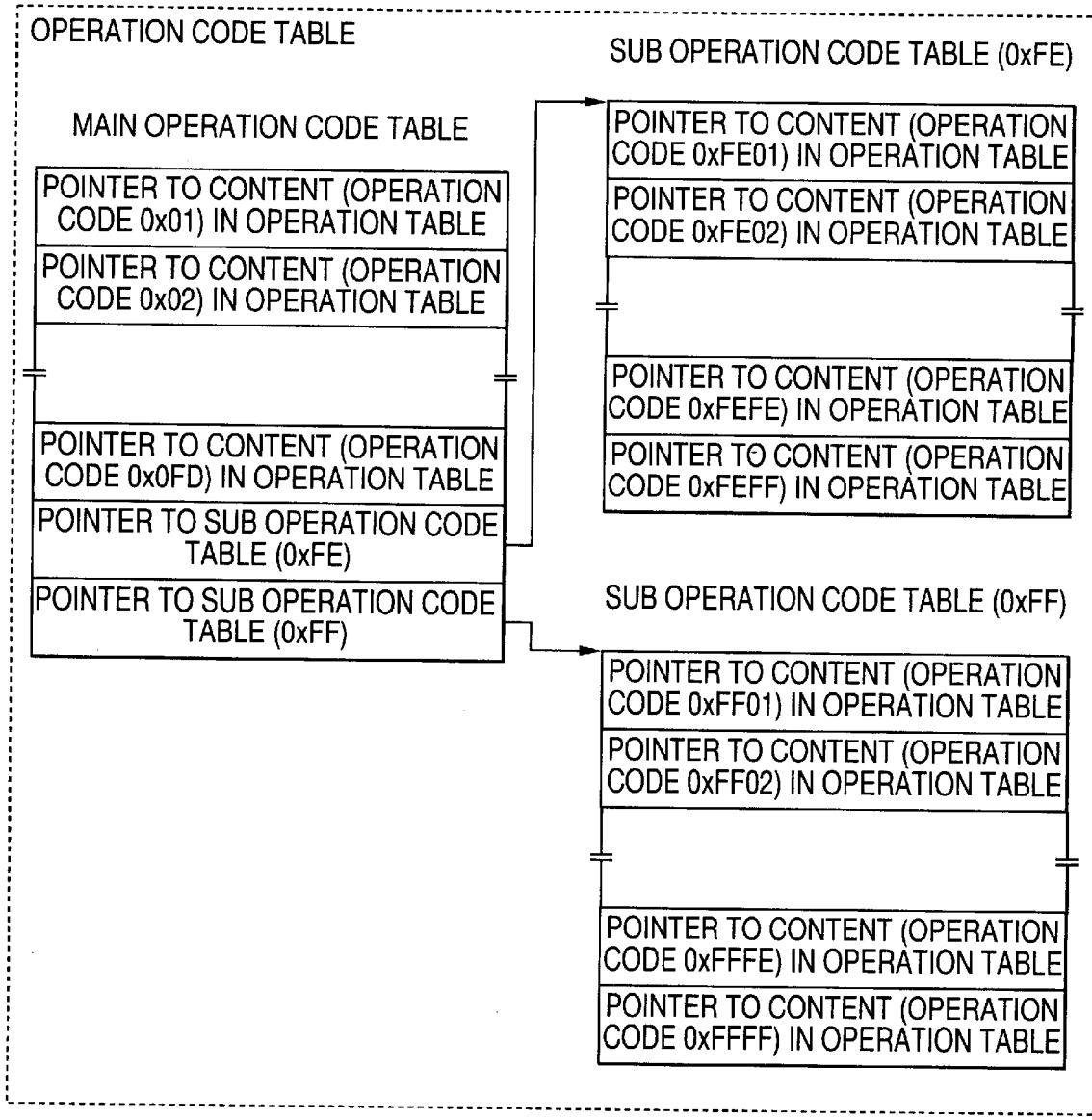
FIG. 1 is an explanatory view showing an operation code table provided with an object conversion apparatus of an embodiment according to the present invention.

As shown in FIG. 1, the operation code table includes a main operation code table and two sub operation code tables.

The operation code table is used to obtain a pointer (relocation address) to an operation table described later from operation codes in an instruction object for another architecture (hereinafter, called "ASP instruction object").

Each data referred by 0x00 through 0xFD in the main operation code table becomes a pointer to each table content in the operation table for each operation code 0x00 through 0xFD contained in the ASP instruction object. Each data referred by 0xFE and 0xFF in the main operation code table becomes a pointer to the sub operation code table for 0xFE, 0xFF. Each data referred by 0x00 through 0xFF becomes a pointer to each table content in the operation table for each operation code 0xFE00 through 0xFEFF. Each data referred by 0x00 through 0xFF is a pointer to each table content in the operation table for each operation code 0xFF00 through 0xFFFF.

In brief, as the operation codes of the ASP instruction object, there are 1-byte codes and 2-byte codes. In the 2-byte operation code, the first byte is 0xFE or 0xFF. Thus, in the object conversion apparatus of the embodiment, the above described operation code table is used, and a pointer to the operation table can be obtained from each operation code of the ASP instruction object.

As shown in FIG. 2, the operation table is provided with plural table contents in a fixed length part (1) and a fixed length part (2).

The fixed length part (1) keeps an identification code, conversion rule information, exception process check information, an object code length, an analysis process entry, an operand pattern process entry, and the fixed length part (2) keeps a pointer to a table content in the skeleton table.

The conversion rule information in the fixed length part (1) specifies whether an object is converted together with the next ASP instruction object. The exception process check information specifies a check method for a specified value of an operand in the corresponding ASP instruction object. The object code length specifies an object code length of the corresponding ASP instruction object. The analysis process entry is an entry address for the process which should be executed in order to analyze the ASP instruction object, and an entry about a procedure independent of the dynamic object conversion is established for an instruction which has no effect though the dynamic object conversion is executed. The operand pattern process entry is an entry address for the operand pattern process. Additionally, the identification code in the fixed length part (1) is stored in order to distinguish table contents easily and is not used for the object conversion.

The skeleton table is provided with a common prototype part and a complex instruction set computing (CISC) instruction prototype part. The common prototype part includes information about a prototype commonly used for conversion of various instructions. The CISC instruction prototype part includes parts of the prototype specification corresponding to the CISC instruction of the ASP order. The pointer for the skeleton table kept in the operation table is a pointer to a table content in CISC instruction prototype part.

FIG. 3 shows the CISC instruction prototype part in the skeleton table. As shown in FIG. 3, the CISC instruction prototype part in the skeleton table includes plural table contents in a fixed length part and a variable length part. The fixed length part keeps an identification code, sort key information, a chain pointer, a number of exchange information, a native code length, and the variable length part keeps exchange information and native code information.

The native code information kept in the variable length part is an object code, in which parts to be stored with codes are spaces, for the converted architecture, namely, the skeleton of the object code. The exchange information specifies to the object code with positions of the spaces, types of codes to be stored in the spaces and so on.

The number of exchange information and the native code length kept in the fixed length part show the number of exchange information and the length of the native information-kept in the variable length part. The sort key information specifies a table content of the common prototype part. The chain pointer is a pointer to another table content in the skeleton table, and is used for relating skeletons when one ASP instruction is a combination of plural skeletons. Additionally, for the table content which is the last content of the chain, "EOF" is established as a chain pointer. The identification code in the fixed length part, similarly to the identification code in the operation table, is kept in order to distinguish table contents easily and is not used for the object conversion.

In this apparatus, based on these tables, the ASP instruction object is converted into an object for another architecture in accordance with the following procedure.

First, by using the operation code of the ASP instruction object, the operation code table is searched so as to obtain a pointer for the operation table. Then, the table content in the operation table designated by this pointer is read. Based on the pointer for the skeleton table contained in the table content, table contents in the skeleton table (such as exchange information and native code information) are read, and a converted object having a variable part is developed in the work area. At this time, when the chain pointer is established, another table content in the skeleton table is also read, and then a converted instruction object generated by this content is also developed in the work area. This process (development of the converted instruction object) is executed in a manner that the ASP instruction object can be executed in the shortest time (entries of the process procedure making such process possible are set in the analysis process entry and the operand pattern processing entry).

When the conversion rule information read from the operation table instructs that the object conversion is executed together with the next ASP instruction, the similar process is executed for the next ASP instruction object. Contrarily, when the conversion rule information instructs that the object conversion is executed not together with the next ASP instruction (the object conversion is interrupted), the converted instruction object group stored in the work area is optimized, and then the converted instruction object group after optimization is stored in a memory as an object actually used.

Hereinafter, the dynamic object conversion process is explained more concretely by using an actual sample.

Since the ASP instruction is used for an is architecture with a lot of general-purpose registers, in this apparatus, general-purpose register groups are mapped in one area of the memory. Thus, the ASP instruction utilizing the general-purpose register is converted into an instruction utilizing one memory area in the memory. For example, there is a LB (Load Bit) instruction of an instruction format shown in FIG. 4(a) as one of the ASP instructions utilizing the general-purpose register. This instruction shifts the area contents of the designated bit length in the main memory to the designated general-purpose register. More concretely, as shown in FIG. 4(b), the instruction shifts contents of the area of the bit length L2 from the L1-th bit from the top of the halfword area obtained by B, X, D, to the lower part of the bit length L2 in the general-purpose register designated by the R part and "0" is set in the remaining parts in the general-purpose register. In addition, the instruction instructs that the bit area designated by L1, L2 must not extend to the halfword boundary (when extending, it becomes an operation exception).

When the LB instruction is converted into a converted instruction object which can be carried out generally (independently of values of L1, L2), the converted instruction object is shown in FIG. 5(a). However, in this apparatus, as shown in FIGS. 5(b) through 5(i), the LB instruction is converted into objects corresponding to operand values. Additionally, in FIGS. 5(a) through 5(i), the EDI is a pointer of the beginning of an area used as a general-purpose register group, and the Rxx is an offset of a memory area corresponding to a general-purpose register of R part designation.

Optimization is executed when the ASP instructions (1) through (4) shown in FIG. 6 are converted. In this case, when each instruction is converted separately, as shown in the middle of FIG. 6, an instruction statement including 12 steps-can be obtained since it is necessary to pass through an internal register in order to shift contents in the general-purpose registers 0, 1 to corresponding memory areas GRO, GR1 in the memory.

However, in the ASP instructions (1), (3), the general-purpose register 0 is used only to store a value appearing in the calculation process, and in the AS1P instruction (4), the value is rewritten with "an answer" of the ASP instruction column. In other words, when the value is set in only an internal register while executing the processes corresponding to the ASP instructions (1), (3), it is unnecessary to store this value in the GRO. Since the GR1 is similar to this, a result equivalent to the ASP instruction statement can be obtained with the instruction column of 6 steps shown in the right side of FIG. 6. This object conversion apparatus is structured so as to execute such optimization when the object developed in the work area is stored in a memory as a converted object to be actually used.

Next, explanations will be given of the whole operation of the object conversion apparatus with reference to FIGS. 7 through 9.

As shown in FIG. 7, when the object conversion apparatus operates, a memory 11 is divided into an application storage area 21 storing an application which is an object to be converted so as to be executed, a program storage area 22 storing a dynamic conversion program, a static conversion object developed area 23 storing a static conversion object, a dynamic conversion object developed area 24 storing a dynamic conversion object, and a data area 25. Each area is used for only its purpose. The application, the dynamic conversion program and the static conversion object are loaded into the application storage area, the program storage area and the static conversion object development area from a storage 12, respectively. In addition, the operation code table, the operation table and the skeleton table are also loaded from the storage 12 as parts of the dynamic conversion program. The application storage area 21, the program storage area 22 and the static conversion object developed area 23 are fixed size areas. The ratio of the dynamic conversion object developed area 24 and the date area 25 can be changed. In the data area 25, a page table is established for specifying whether each page of the application object to be converted is for the dynamic object conversion or not.

As shown in FIG. 8, the page table is structured so as to have N pieces of information storage areas when an application to be converted (actually, OS for ASP architecture) includes N pages (4 kB per one page in the embodiment). The page table is updated by the operation of this apparatus.

At the initial state, in the information storage area corresponding to a page not for the dynamic object conversion, information indicating that the page is not a subject (0x00000000 in this apparatus) is set, and in the information storage area corresponding to a page for the dynamic object conversion, 0x10000000 is set. Use frequency is the number of times an object is executed, and is determined in advance by a user of the present invention. If the user believers the object will be executed frequently, the user sets a flag (i.e., the first number in each row of the page table) to "1", as shown in FIG. 8. Otherwise, the user sets the flag to "0". As shown in FIG. 8, the page used with high frequency is designated as a page to which the dynamic object conversion is executed.

The dynamic conversion object developed area, as shown in FIG. 8, is divided into a number of segments, the number corresponding to the capacity of the memory used as the dynamic conversion object developed area so as to be used. The number of pages for the dynamic conversion is set independently of the number of segments established in the dynamic conversion object developed area 24.

In this apparatus, the page table and the dynamic conversion object developed area are used as follows, and an application for a different architecture is converted so as to be executed.

Figure 9:
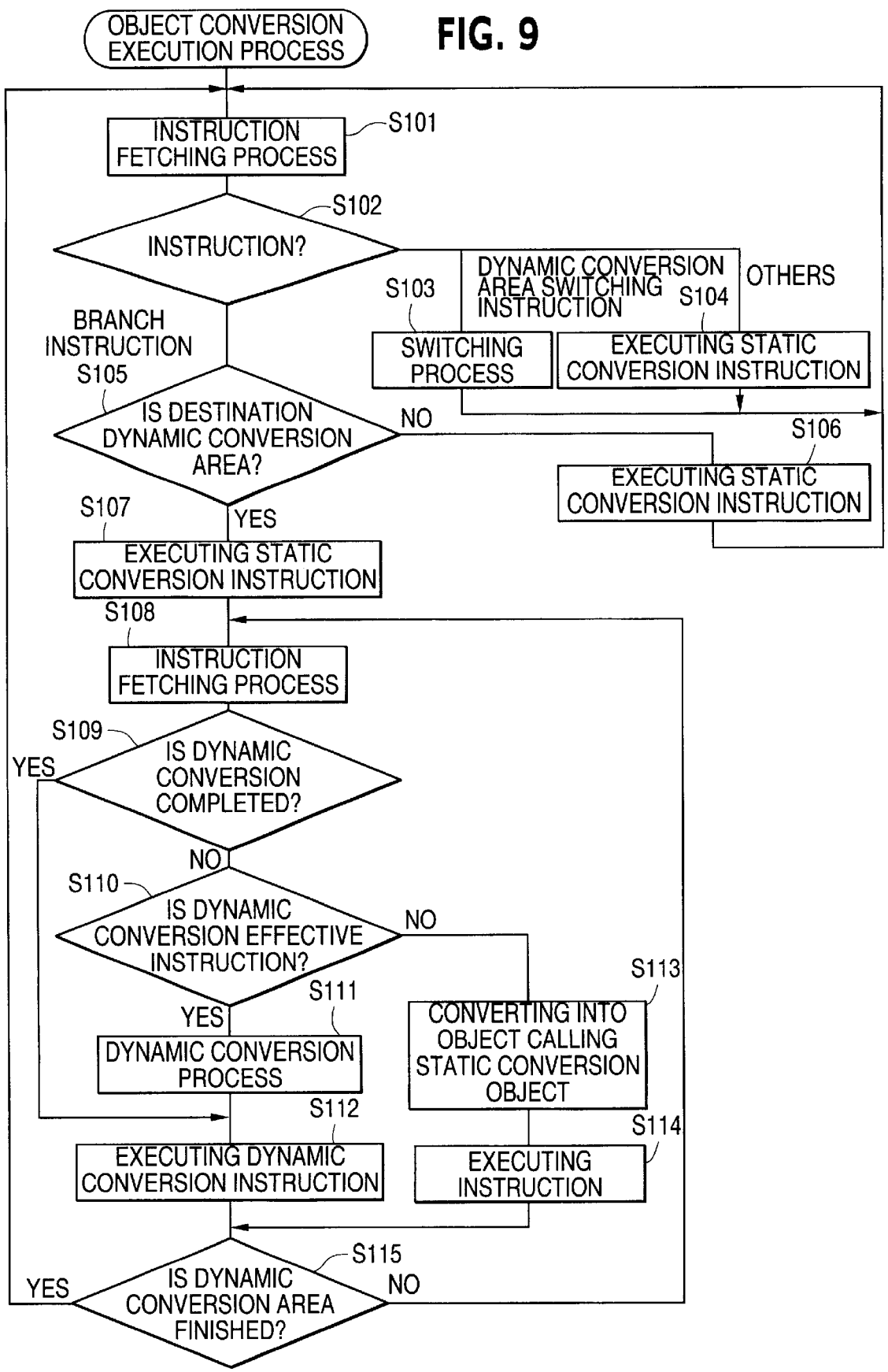
FIG. 9 is a flowchart showing a whole operation procedure in the object conversion apparatus of the embodiment.

As shown in FIG. 9, when converting and executing an application, first, an ASP instruction is fetched (step S101), and a kind of the instruction is judged (step S102). When the instruction is a dynamic conversion area switching instruction (step S102; switching instruction), the switching process is executed (step S103). Additionally, the dynamic conversion area switching instruction is inserted into the application in order to initialize the dynamic object storage area and the storage area used for management (in order to execute the switching process).

When the instruction is neither dynamic conversion area switching instruction nor branch instruction (step S102; other), the instruction is executed with the static conversion object (step S104), and then the process from the step S101 is executed again.

When the instruction is the branch instruction (step S102; branch instruction), it is judged whether the destination is an area for the dynamic conversion with reference to the page table (step S105). When the destination is not an area for the dynamic conversion (step S105; N), the instruction is executed with the static conversion object (step S106), thereafter, the process is returned to the step S101 and the process for the next instruction is executed.

When the destination is an area for the dynamic conversion (step S105; Y), the branch instruction is statically executed (step S107), thereafter, the next instruction in the area for the dynamic conversion is fetched (step S108) and it is judged whether the dynamic conversion for this instruction is completed or not (step S109). Detailed description will be given later of this determining procedure. For example, when contents of the page table are initial values, it is not determined that the dynamic conversion is executed in step S109 (N), and then it is judged whether the dynamic conversion of this instruction is effective or not based on information stored in the operation table (step s110).

When the dynamic conversion of th is instruction is effective (step S110; Y), the dynamic conversion is executed with the procedure already explained. Then, the result is stored in a segment for a dynamic conversion object. When no segment number is set in the page table, a segment number of this segment is set in the page table (step S111).

At this time, a content of the table called "segment table" is also updated, and detailed description thereof will be given later.

Then, the dynamic-converted instruction is executed (step S112). When the executed instruction is the last order in the dynamic conversion object area, such as the branch instruction and the last instruction of the page (step S114; Y), the process is executed from the step S101. On the other hand, when the executed instruction is not the last order in the dynamic conversion object area (step S114; N), the process is executed from the step 5108.

When the dynamic conversion is not yet completed as to the fetched instruction (step S109; N) and when the dynamic conversion is not effective (step S110; N), this instruction is converted into an object calling the static conversion object (step S113). Subsequently, the instruction is executed, the process is advanced to the step S114, and it is judged whether the dynamic conversion area is finished or not in step S115.

When the dynamic conversion is already completed as to the fetched instruction (step S109; Y), the converted instruction is executed immediately (step S112), and then the process in step S115 is executed.

Hereinafter, more concrete explanations will be given of the above described operation by giving an example in that the conversion object is shown in FIG. 10, areas 1, 4 are set so as to be dynamically converted, and areas 0, 2 and 3 are set not to be dynamically converted.

In this case, the following process is executed for each instruction in each area. For the instruction (1) in the area 0, the dynamic conversion object developed area is initialized. For the instruction (2), the test instruction TST is executed. For the instruction (3), since the instruction is an unconditional branch instruction JMP, it is checked whether the destination is the dynamic conversion area or not. Then, the destination is the dynamic conversion area, for the instruction (5), it is checked whether the dynamic conversion of this instruction is completed or not. Then, though the instruction (4) is the unconditional branch instruction JMP, the destination is not the dynamic conversion area, therefore, for the next instruction, it is not checked whether the dynamic conversion of this instruction is completed or not.

The instruction (5) in the area 1 is an add instruction ADD regarded as an effective instruction, therefore, when the dynamic conversion is not yet completed, the dynamic conversion is executed, and then the instruction is executed. Needless to say, when the dynamic conversion is completed, the dynamic-converted object is executed immediately. Then, the CVD instruction (6) is an instruction in the dynamic conversion area, but is not an instruction for which the dynamic conversion is not effective. Thus, this instruction, when not yet converted, is converted into an object calling a static object.

As to other instructions, processes are also executed similarly with the procedure in accordance with conditions, such as whether the instruction is in the dynamic conversion area or not, whether the dynamic conversion is effective or not, whether the dynamic conversion is already completed or not, and whether the branch instruction is for the dynamic conversion area or not.

Hereinafter, more detailed explanations will be given of this apparatus.

Since a number of pages to be dynamic-converted is generally set larger than a number of segments for dynamic conversion objects, there will be a case in that there is no vacant segment for a dynamic conversion object when this apparatus is continuously used. Thus, in this apparatus, the table named a segment table is also used for management of segments for dynamic conversion objects.

Figure 11:
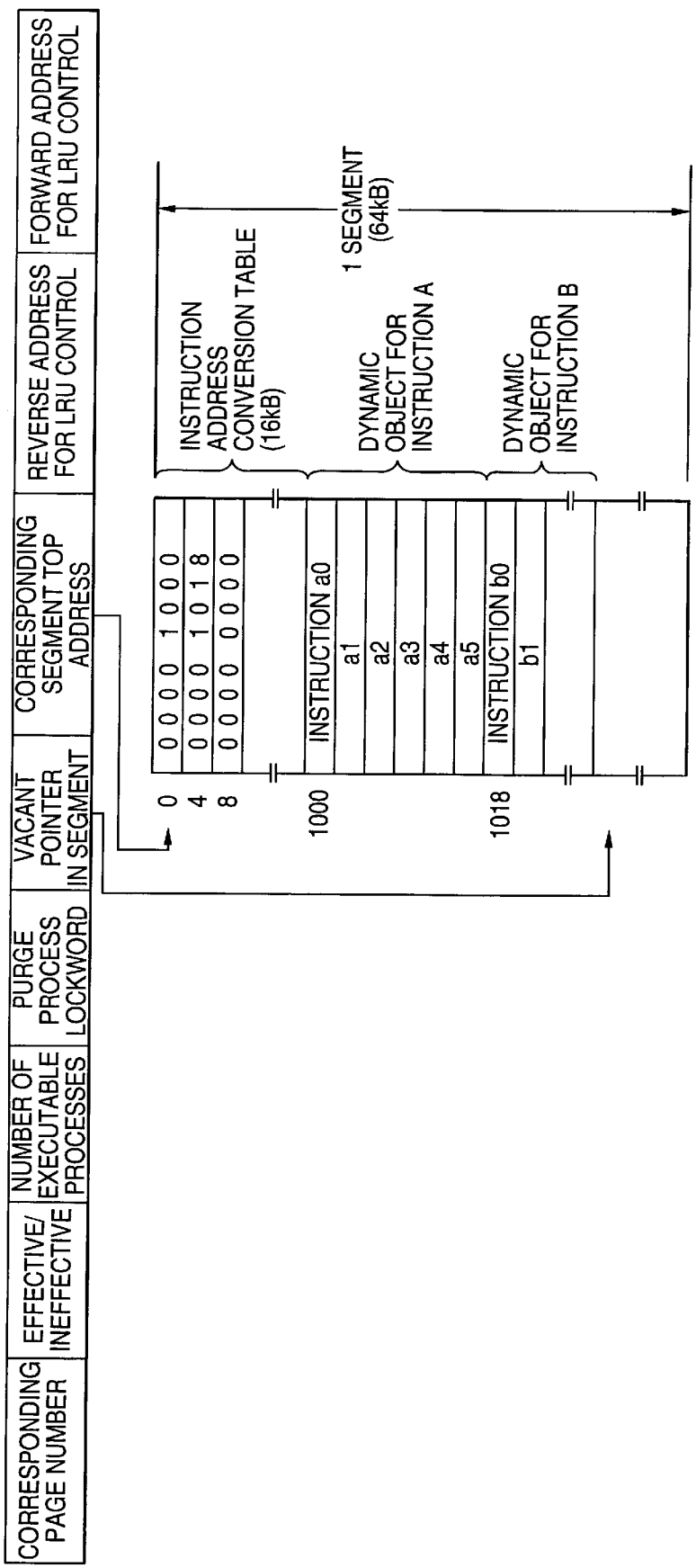
FIG. 11 is an explanatory view showing a segment table and a segment for a dynamic conversion object set in the object conversion apparatus of embodiment.

One segment table is prepared for one dynamic conversion object segment. As shown in FIG. 11, the segment table keeps a corresponding page number, an effective/ineffective flag, a number of executable processes, a lockword, a vacant pointer in a segment, a corresponding segment top address, and a reverse/forward address for LRU (Least Recently Used) control. In addition, the segment table is corresponded to one conversion object segment with the corresponding segment top address and is corresponded to the page table with the page number.

The reverse/forward address for LRU control in the segment table is information used to specify segment to be purged when there is no vacant dynamic conversion object segment.

Figures 12A, 12B:
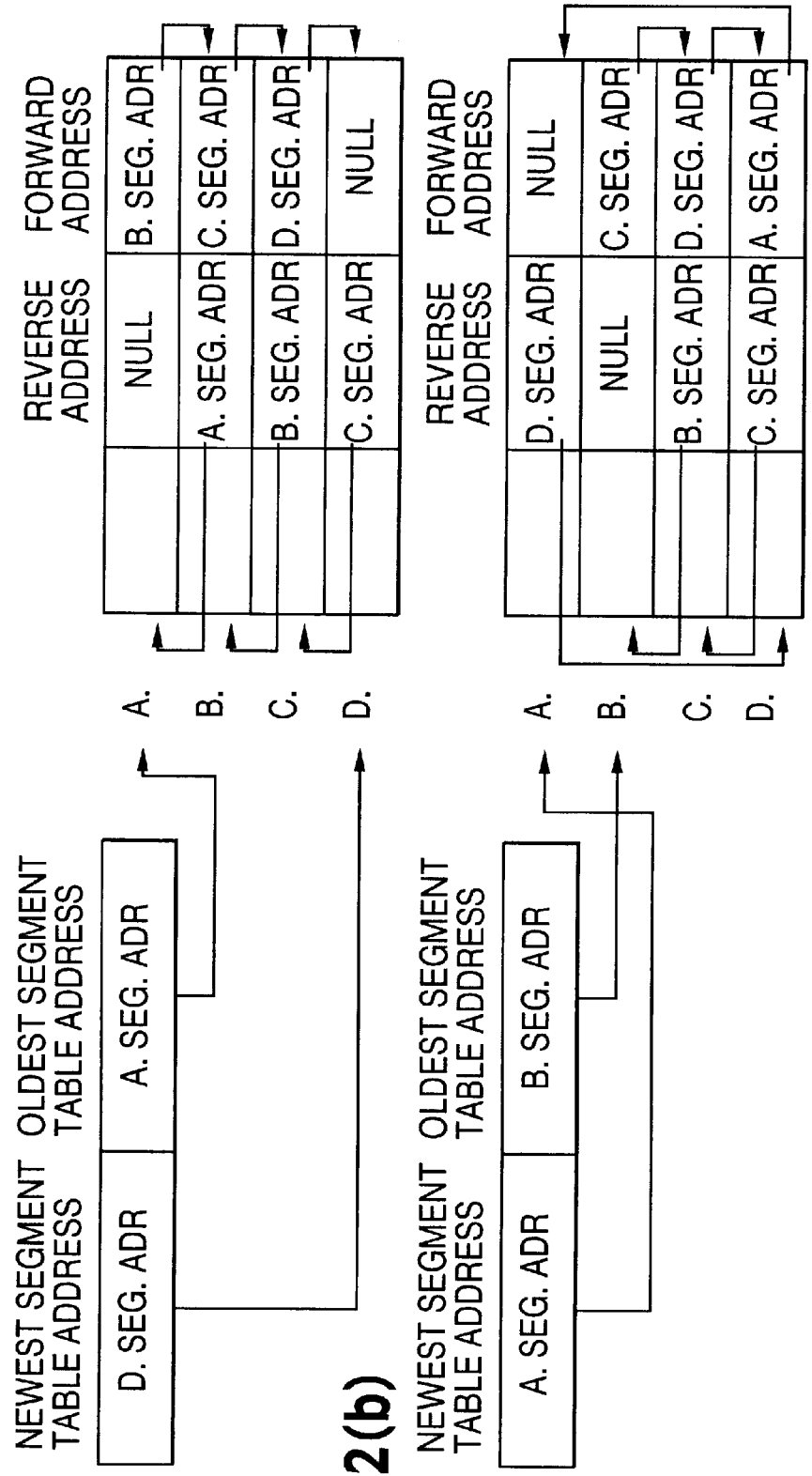
FIGS 12(a) and 12(b) are explanatory views showing a process executed when it is necessary to purge a segment memorizing the dynamic conversion object with the object conversion apparatus of the embodiment.

Concretely, as shown in FIG. 12(a), forward addresses are set in a manner that, when a forward address of a segment table is read, it is possible to obtain a segment table address of a segment used next to the segment corresponding to that segment table. Further, reverse addresses are set in a manner that, when a reverse address of a segment table is read, it is possible to obtain a segment table address of a segment used before the segment corresponding to that segment table. The segment table is managed, so that NULL indicating the most recently used segment or the most formerly used segment is set for each of the forward address of the segment table corresponding to the most recently used dynamic object segment and the reverse address of the segment table corresponding to the most formerly used dynamic object segment.

In this apparatus, areas are prepared to store the latest segment table address which is the address of the segment table about the most recently used segment and the oldest segment table address which is the address of the segment table about the most formerly used segment. When the segment must be purged, a segment to be purged is specified and data in the segment table is rewritten to show that the segment is most recently used, by using the latest/oldest segment table addresses, the forward/reverse addresses in the segment table identified with these addresses, and the like.

For example, in a state shown in FIG. 12(a), when one segment table and a corresponding segment are purged, usually, a segment table and a corresponding segment identified by the oldest segment address are purged as follows. First, the secondly oldest segment table indicated by "B" in FIG. 12(a) is obtained by reading the forward address from the segment table identified by the oldest segment table address. Then, NULL is set in the reverse address of the segment table B, and the address of the segment table B is set as the oldest segment table address. Subsequently, the corresponding dynamic object segment is initialized and related information in the page table is initialized. Further, the address of the segment table A is set in the forward address of the segment table identified by the latest segment table address. Subsequently, the latest segment table address (D) is set in the reverse address of the segment table A, and NULL is set in the forward address. Thereafter, the address of the segment table A is set as the latest segment table address, and then the purge is completed.

As shown in FIG. 11, the size of the dynamic conversion object segment is 64 kB. 16 kB is used as an instruction address conversion table. The instruction address conversion table corresponds to an instruction address in a corresponding page in the ASP space with a top address in an instruction group after conversion. For example, "00001000" (hexadecimal notation) shown in the top of the instruction address conversion table is information showing that a dynamic object corresponding to an instruction of a relative address 0 in the corresponding page starts at a position of "00001000" from the top of the segment. As already explained, information related to a dynamic conversion page in the page table is provided with a significant segment number when at least one instruction in the page is dynamically converted. In other words, though an instruction to be processed is not dynamic-converted, there is a case that corresponding information in the page table keeps a significant segment number. Thus, in the above-described step S109, it is actually judged whether the dynamic conversion is completed or not with reference to contents of the instruction address table when segments are allocated to the page containing an instruction to be processed.

Figure 13:
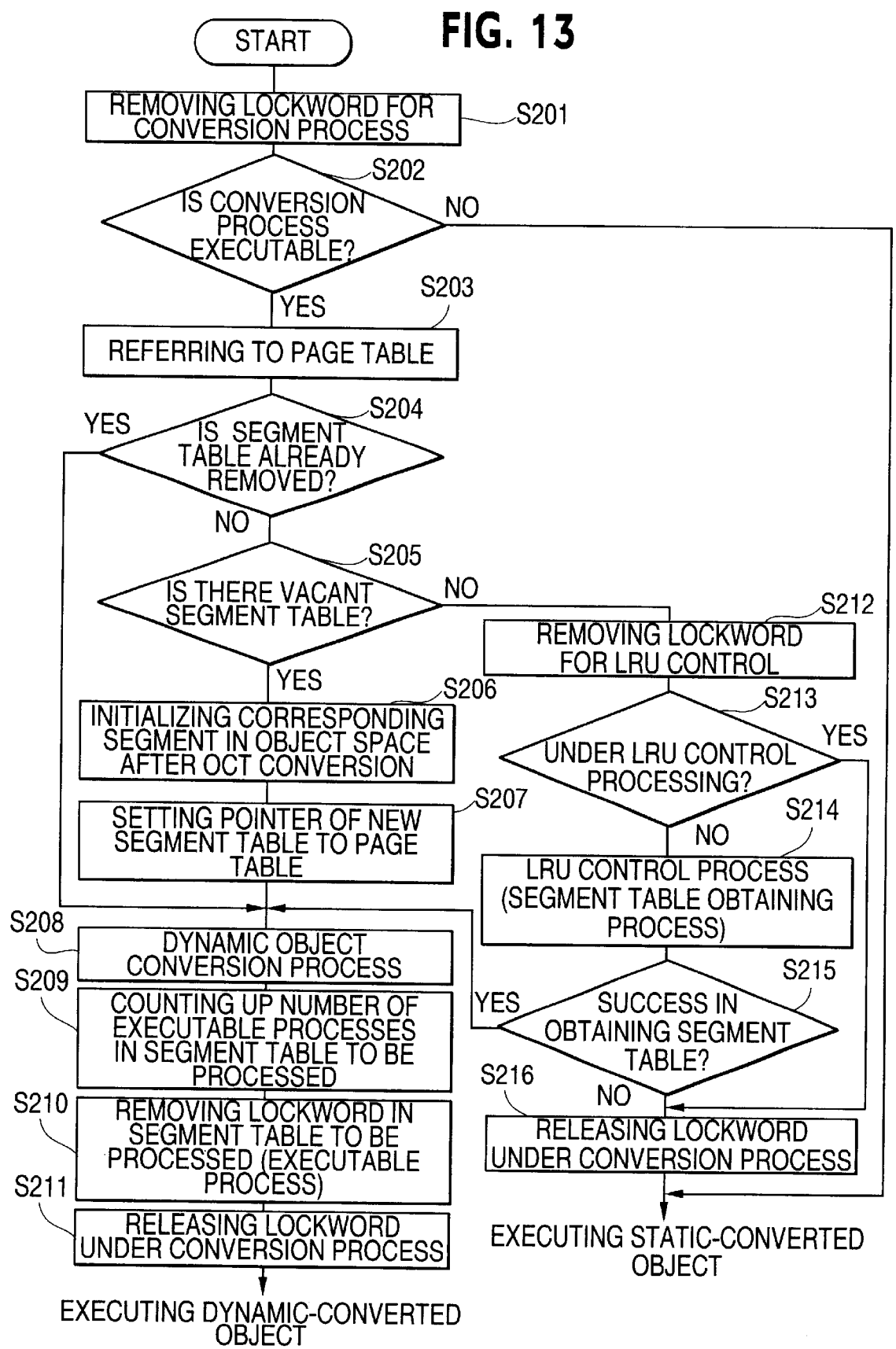
FIG. 13 is a detailed flowchart showing the dynamic object conversion process executed by the object conversion apparatus of the embodiment.

In the step S111, the process of the procedure shown in FIG. 13 is actually executed by using this segment table.

In other words, when an instruction to be dynamic-converted is fetched, first, it is tried to obtain the lockword for the conversion process in order to confirm whether the conversion process is executed by another process (step S201). When the lockword can be obtained, namely, when the conversion process can be executed (step S202; Y), it is judged whether or not a segment table is obtained (prepared) for a page containing ain instruction to be processed (step S204). When the segment table is obtained (step S204; Y), the dynamic object is generated with the already explained procedure (step S208), and the number of executable processes in the segment table to be processed is counted up (step S209). Subsequently, for execution, the lockword in the segment table to be processed is removed (step S210), and the lock in the conversion process is released (step S211). Then, the dynamic-converted object is executed, and the lock of the segment table to be processed is released after the execution is completed.

When the instruction to be dynamic-converted is in a page for which no segment table is obtained (step S204; N), it is judged whether there is a vacant segment table or not (step S205). This judgement is executed by confirming a description of the effective/ineffective flag.

When there is a vacant segment table (step S205; Y), a vacant dynamic object segment assigned to the page containing the instruction to be dynamic-converted is decided, this dynamic object segment is initialized, and information related to the dynamic object segment is stored in the vacant segment table (step S206). Subsequently, a pointer of the new segment table is set in the page table (step S207), and the already explained process from the step S208 is executed.

When there is no vacant segment table, it is tried to obtain a lockword for the LRU control (step S212). When the LRU control is executed by another process (step S213; Y), namely, when no lockword can be obtained, the lock in conversion processing is released (step S216), and the object after not the dynamic conversion but the static conversion is executed.

When a lockword for the LRU control can be obtained (step S213; N), the LRU control process to obtain a segment table is executed (step S214). When a segment table can be obtained in the LRU control process(step S215; Y), the process from step S208 is executed, arid when it can not be obtained (step S215), the process; from the step S216 is executed.

Figure 14:
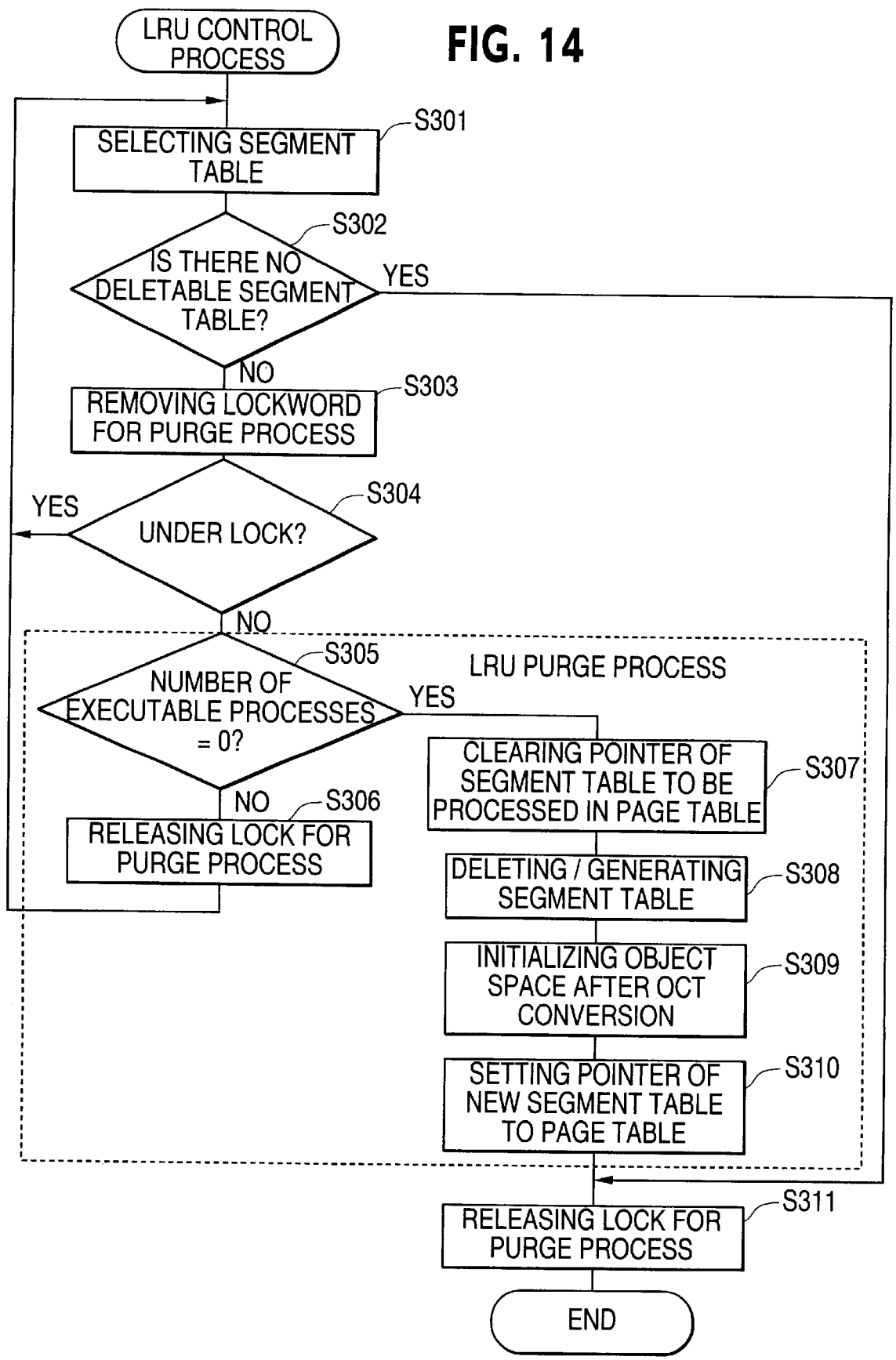
FIG. 14 is a flowchart showing a LRU control process executed by the object conversion apparatus of the embodiment.

As shown in FIG. 14, in the LRU control process, first, one segment table is selected (step S301). As obvious from FIG. 14, the step S301 is repeatedly executed, and in the first executed step S310, the most formerly used segment table is selected. And, in step S301 executed secondly or more after, the segment table used after the previously selected segment table is selected.

When this selection can be executed (step S302; N), it is tried to obtain lockwords for this segment table and for the front and rear segment tables (related with the forward address and the reverse address) in order to execute purge process (step S303).

When it is impossible to obtain lockwords for the segment tables to be processed, namely, when the objects related to this segment tables is being executed by another process (step S304; Y), the process is returned to the step S301 and the next segment table is selected.

When lockwords can be obtained (step S304; N), it is judged whether the number of executable processes is "0" or not, and when the number is not "0" (step S305; N), the lock for the purge process is released (step S306) and then the next segment table is selected.

When the number of executable processes is "0" (step S305; Y), in order to use the segment table as a segment table for the page containing an instruction to be processed currently, the pointer about the segment table in the page table is cleared (step S307). Subsequently, the contents of the segment table to be processed are rewritten (step S308), and the corresponding dynamic object segment is initialized (step S309). Subsequently, in the memory area for this page in the page table, a pointer of the segment table is set (step S310), the lock for the purge process is released (step S311), and then the LRU control process is finished. In other words, the LRU control process is finished when the process advances to "Y" side in the step S215.

On the other hand, when the execution is not locked, and when there is no segment table in which the number of executable processes is "0" (step S302; Y), the lock for the purge process is released without obtaining a segment table (step S311), and the LRU control process is finished.

As above described, according to the object conversion apparatus of this embodiment, in combining the dynamic object conversion and the static object conversion, an object is converted and executed, therefore, the object conversion apparatus operates in a state that a memory is more effectively used, namely, at higher speed than a conventional apparatus executing object conversion. Further, it is possible to set a size of the dynamic conversion object developed area and a page to be dynamic-converted, therefore, the object conversion apparatus can be used according to an application to be processed and the real operating condition.

<Modification>

Figure 15:
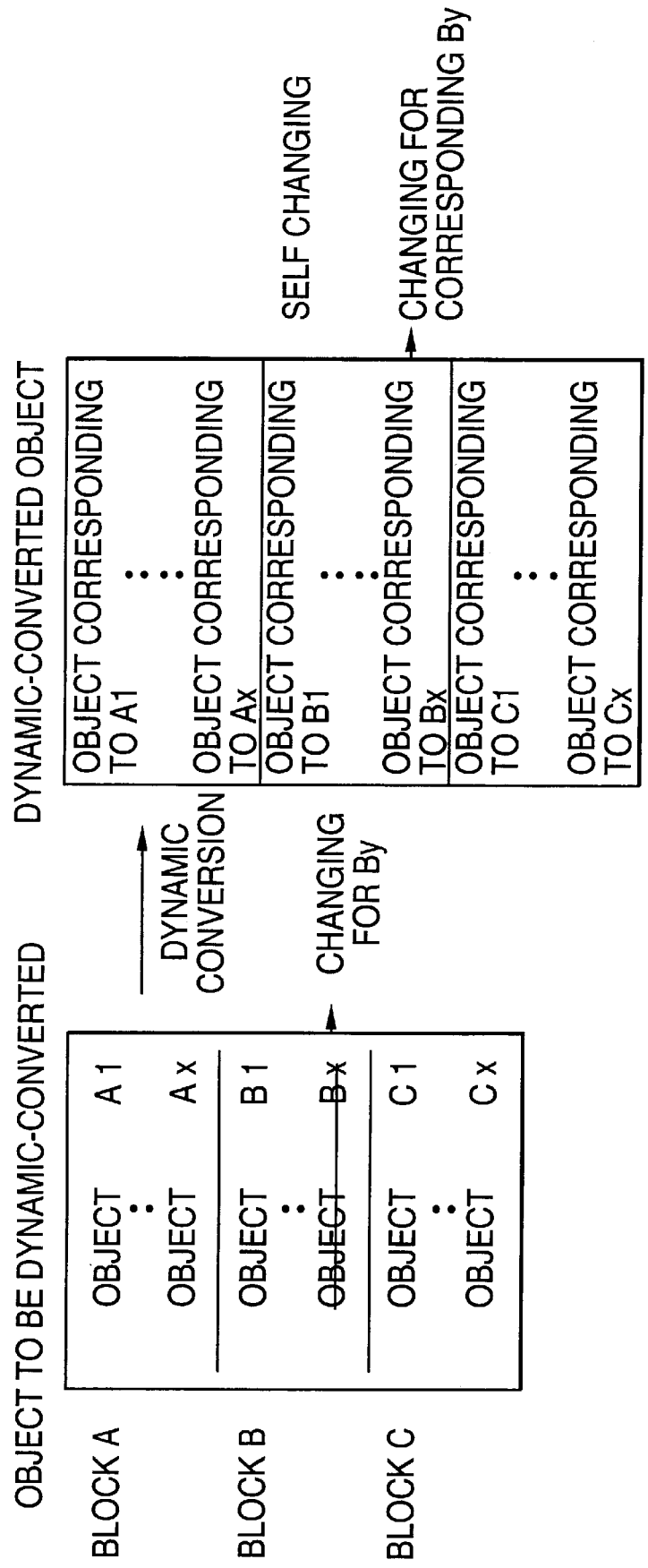
FIG. 15 is an explanatory view showing a modification of an object conversion apparatus according to the present invention.

The object conversion apparatus of the embodiment can be modified in various ways. For example, the size of one page and the size of the segment for the dynamic conversion object may not be limited to those shown in the embodiment. And, among application programs, there is an application program which rewrites its own description. As shown in FIG. 15, when such rewriting is executed (the object Bx is rewritten for the object By in FIG. 15), only the corresponding dynamic conversion object may be changed for a dynamic conversion object equivalent to an object after rewriting.

This invention being thus described, it will be obvious that same may be varied in various ways. Such variations are not to be regarded as departure from the spirit and scope of the invention, and all such modifications would be obvious for one skilled in the art intended to be included within the scope of the following claims.

What is claimed is:

1. An object conversion apparatus converting a first object defined as an object to be converted, the first object operating in a first architecture into a second object defined as a converted object, the second object operating in a second architecture in the same manner as the first object, said object conversion apparatus comprising:

first storage means for storing user-defined frequency of use information showing whether the first object is used with high frequency;

determining means for determining whether the first object is used with high frequency based on the frequency information stored in said first storage means;

second storage means for storing the second object corresponding to the first object determined by said determining means as being used with high frequency; and object conversion execution means, in a case that said determining means determines that the first object is used with high frequency, for executing the second object when the second object corresponding to the first object is stored in said second storage means, and for converting the first object into the second object when the second object corresponding to the first object is not stored in said second storage means, the executing and converting occurring on one processor.

2. An object conversion apparatus according to claim 1, wherein said object conversion execution means, for a specified object among the first objects determined by said determining means as used with high frequency, executes a prepared object operating in the second architecture in the same manner as the specified object.

3. An object conversion apparatus according to claim 1, wherein the frequency information shows whether the first object is used with high frequency per page containing the first object;

wherein said second storage means is provided with a predetermined number of and predetermined sizes of memory areas, further comprising management means for managing a relation between the page and the memory area in said second storage means; and wherein said object conversion execution means stores the second object obtained by converting the first object in the memory area of said second storage means, the memory area corresponding to the page with said management means.

4. An object conversion apparatus according to claim 3, further comprising:

change means for changing the predetermined number of the memory areas in said second storage means.

5. An object conversion apparatus according to claim 3, where in said management means manages an used order of the second object in each of the memory areas, and, when all of the memory areas are used to store second objects and when it is necessary to store in said second storage means with a second object corresponding to a first object in a new page, purges a second object in a most formerly used memory area and uses the memory area for the new page.

6. An object conversion apparatus according to claim 5, wherein said management means manages a number of processes using the second object in each of the memory areas, and, when all of the memory areas are used to store the second objects and when it is necessary to store in said second storage means with the second object corresponding to a first object in a new page, purges the second object in a most formerly used memory area among memory areas in which the number of processes is not more than a predetermined value.

7. An object conversion apparatus according to claim 1, wherein said object conversion execution means generates the second objects corresponding to a plurality of the first objects determined by said determining means as used with high frequency.

8. An object conversion method of converting a first object defined as an object to be converted, the first object operating in a first architecture into a second object defined as a converted object, the second object operating in a second architecture in the same manner as the first object, the object conversion method comprising:

setting and storing frequency of use information by a user showing whether the first object is used with high frequency;

determining whether the first object is used with high frequency based on the set frequency information; and executing, in a case that said determining determines that the first object is used with high frequency, the second object when the second object corresponding to the first object is stored, and converting the first object into the second object corresponding to the first object when the second object corresponding to the first object is not stored, the executing and converting occurring on one processor.

9. A program medium containing a program converting a first object defined as an object to be converted, the first object operating in a first architecture into a second object defined as a converted object, the second object operating in a second architecture in the same manner as the first object, the program executing:

setting and storing frequency of use information by a user showing whether the first object is used with high frequency;

determining whether the first object is used with high frequency based on the set frequency information; and executing, in a case that said determining determines that the first object is used with high frequency, the second object when the second object corresponding to the first object is stored, and converting the first object into the second object corresponding to the first object when the second object corresponding to the first object is not stored, the executing and converting occurring on one processor.

10. An object conversion apparatus converting a first object operating on a first architecture into a second object operating on a second architecture, comprising:

a first storage unit storing frequency information indicating whether the first object is used frequently;

a second storage unit storing the second object when the first object is an object used frequently; and an object conversion execution unit executing, when the first object is used frequently, the second object when the second object is stored in said second storage unit, and converting the first object into the second object when the second object is not stored in said second storage unit, the execution and conversion being performed on one processor.

* * * * *